Oct. 19, 1943.  V. E. MacDONELL  2,331,992
METALLURGICAL FURNACE
Filed March 14, 1942  3 Sheets-Sheet 3

INVENTOR
VERNON E. MacDONELL
BY
ATTORNEYS

Patented Oct. 19, 1943

2,331,992

UNITED STATES PATENT OFFICE 2,331,992

METALLURGICAL FURNACE

Vernon E. MacDonell, Metuchen, N. J., assignor to International Smelting and Refining Company, a corporation of Montana Application March 14, 1942, Serial No. 434,709

11 Claims. (Cl. 266—33)

This invention relates to metallurgical furnaces, and more particularly to metal melting furnaces. The invention has for its principal object to provide an improved furnace of the type in which solid metal is melted principally by radiant heat.

Various types of muffle furnaces, in which metal is melted at least in part by radiant heat, have been proposed and employed in the past. These furnaces for the most part are designed for introducing the metal directly into a pool of molten metal maintained in the furnace melting chamber.

In United States Patent No. 2,265,284, granted December 9, 1941, on an application of Philip M. Hulme and Robert A. Ghelardi, assigned to the same assignee as this application, a novel process is described for melting copper in a fuel-fired muffle furnace substantially solely by means of radiant heat. In application, Serial No. 386,986, filed April 5, 1941, in the names of Philip M. Hulme and Robert A. Ghelardi, now Patent No. 2,298,055, October 6, 1942, and also assigned to the same assignee as this application, it is pointed out that the melting capacity of such a muffle furnace for melting copper may be increased if provision is made for heating the solid copper substantially to its melting point by radiant heat before introducing the copper into the bath of molten metal within the furnace. The present invention provides an improved form of melting furnace especially adapted for carrying out the process described in the aforementioned patent application.

The new furnace comprises side and end walls enclosing a melting chamber and a combustion chamber which are separated by a thin, substantially gas-tight partition. Means are provided for introducing hot combustion gases into the combustion chamber in contact with the partition, whereby it may be heated sufficiently to radiate heat to a metal charge in the melting chamber.

A charging opening is formed in at least one of the furnace walls for introducing solid metal into the melting chamber. Within the melting chamber and adjacent the charging opening is a ledge which extends inwardly to a point directly beneath the heat-radiating partition. The arrangement is such that metal introduced through the charging opening may be held on the ledge and may be heated in the solid state by radiant heat from the partition before the metal is passed into the molten bath in the melting chamber. Advantageously the ledge slopes downwardly from the charging opening so as to facilitate the passage thereover of solid metal introduced through the charging opening.

The ledge itself advantageously comprises a supporting structure of inversely arched refractory masonry, carrying (at least in the central portion of the ledge) a surface layer of refractory masonry which is arched toward the charging opening. Each course of masonry in the surface layer may be offset downwardly with respect to the course next nearer the charging opening, and a plurality of refractory rails may be set in the surface layer of the ledge in such manner that the upper surface of the rails projects slightly above the surrounding masonry surface. This arrangement permits solid metal to be pushed along the ledge with a minimum of risk that thereby some of the masonry will be dislodged from the ledge. A buttressing course of masonry may be disposed immediately before the ledge to reinforce the end of the ledge within the melting chamber.

The invention will be better understood from the following description, considered in conjunction with the accompanying drawings, in which Fig. 1 is a longitudinal vertical section through a furnace constructed in accordance with the invention;

Figure 1:
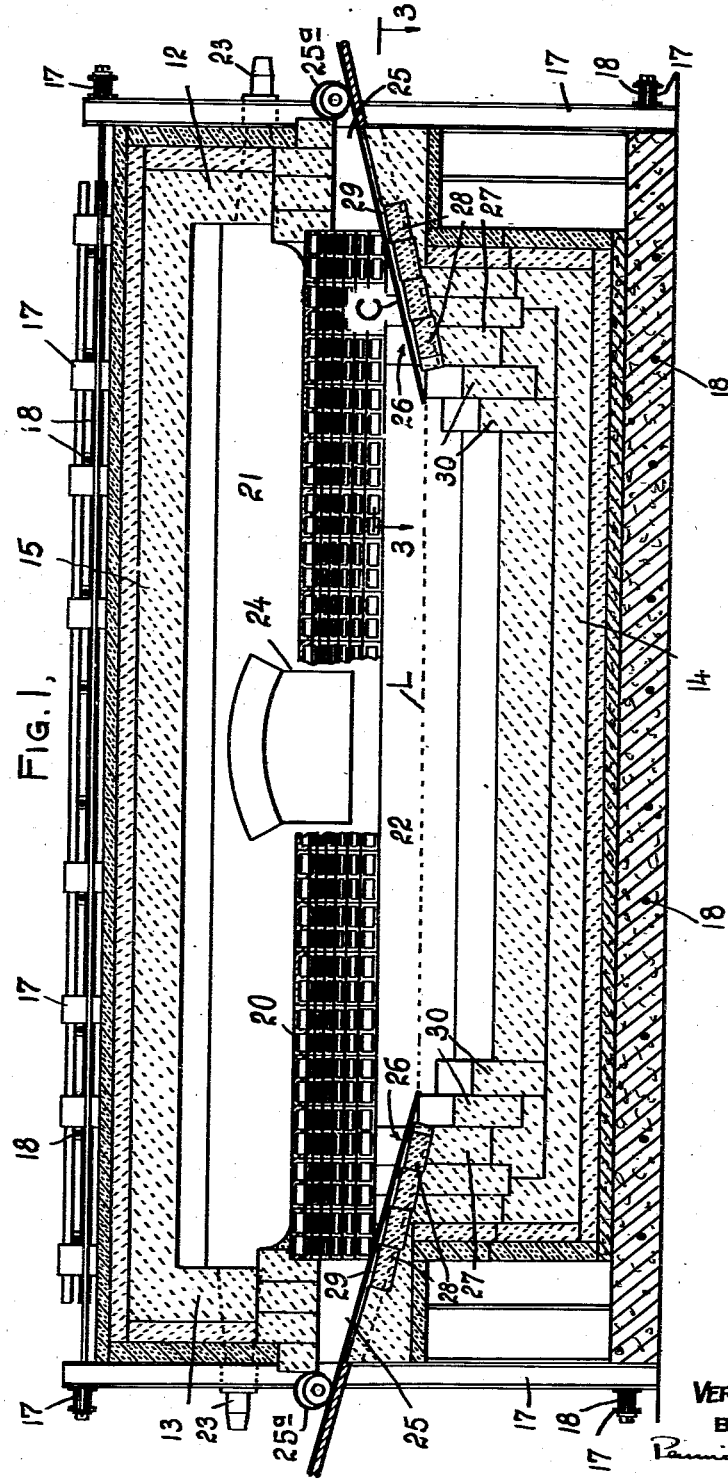

The furnace shown in the drawings comprises side walls 10 and 11, end walls 12 and 13, a floor 14, and a roof 15. The walls, floor, and roof are composed of refractory brick work laid up in accordance with usual furnace construction practice. Advantageously the side and end walls and the roof are provided with an outer layer of insulating brick to minimize heat losses. The floor 14 is inversely arched in the usual manner, and the roof 15 is in the form of a conventional arch bearing against skewbacks 16 at the top of the furnace side walls. The furnace is reinforced in the usual manner by means of vertical buckstays 17 at the sides and ends of the furnace and by horizontal tie rods 18 extending the length and width of the furnace above the roof and below the floor.

A thin arch 20, advantageously formed of a good heat-conducting refractory such as silicon carbide, divides the interior of the furnace into an upper combustion chamber 21 and a lower melting chamber 22. Burners 23 extend through the furnace end walls 12 and 13 into the combustion chamber. Fuel introduced through the burners 23 is burned in the combustion chamber, and the hot combustion gases thereby produced pass through the combustion chamber in contact with the upper surface of the thin arch 20 to a flue 24 communicating through the side wall 11 with the interior of the combustion chamber. The flue 24 conducts the combustion gases to a chimney. If desired, these gases may first be passed through a waste heat boiler or other heat recuperating means before being allowed to escape into the atmosphere.

A charge opening 25 is formed in each of the furnace end walls to permit the introduction into the melting chamber of solid metal to be melted. If desired, a seal 25a of the character described in my Patent No. 2,278,275, March 31, 1942, may be installed over these charging openings, or some other form of seal may be employed, in order to exclude air from the melting chamber, or to retain any special gas atmosphere that may be introduced into the melting chamber.

Ledges 26 are provided within the melting chamber immediately adjacent each of the charge openings. The ledges slope downwardly from the charge opening toward the central portion of the melting chamber, and extend into the melting chamber to a point directly beneath the arch 20. The ledges each comprise a base structure 27 which is composed of refractory masonry laid in the form of an inverted arch. The inverted arch construction is desirable so as to resist the tendency of the individual bricks to break loose and float to the surface of the pool of molten metal normally maintained within the melting chamber.

The central surface portion of each ledge 26 is composed of several courses 28 of refractory masonry, which are arched toward the adjacent charge opening. Advantageously, the bricks laid in these surface courses of the ledge are composed of silicon carbide or other hard and mechanically strong refractory, in order better to withstand the abrasive action of solid metal being pushed over them and into the pool of molten metal within the melting chamber. The arching of these courses 28 toward the adjacent charge opening provides a construction which serves to resist the tendency of the metal being pushed over them to dislodge bricks therefrom.

Figure 2:
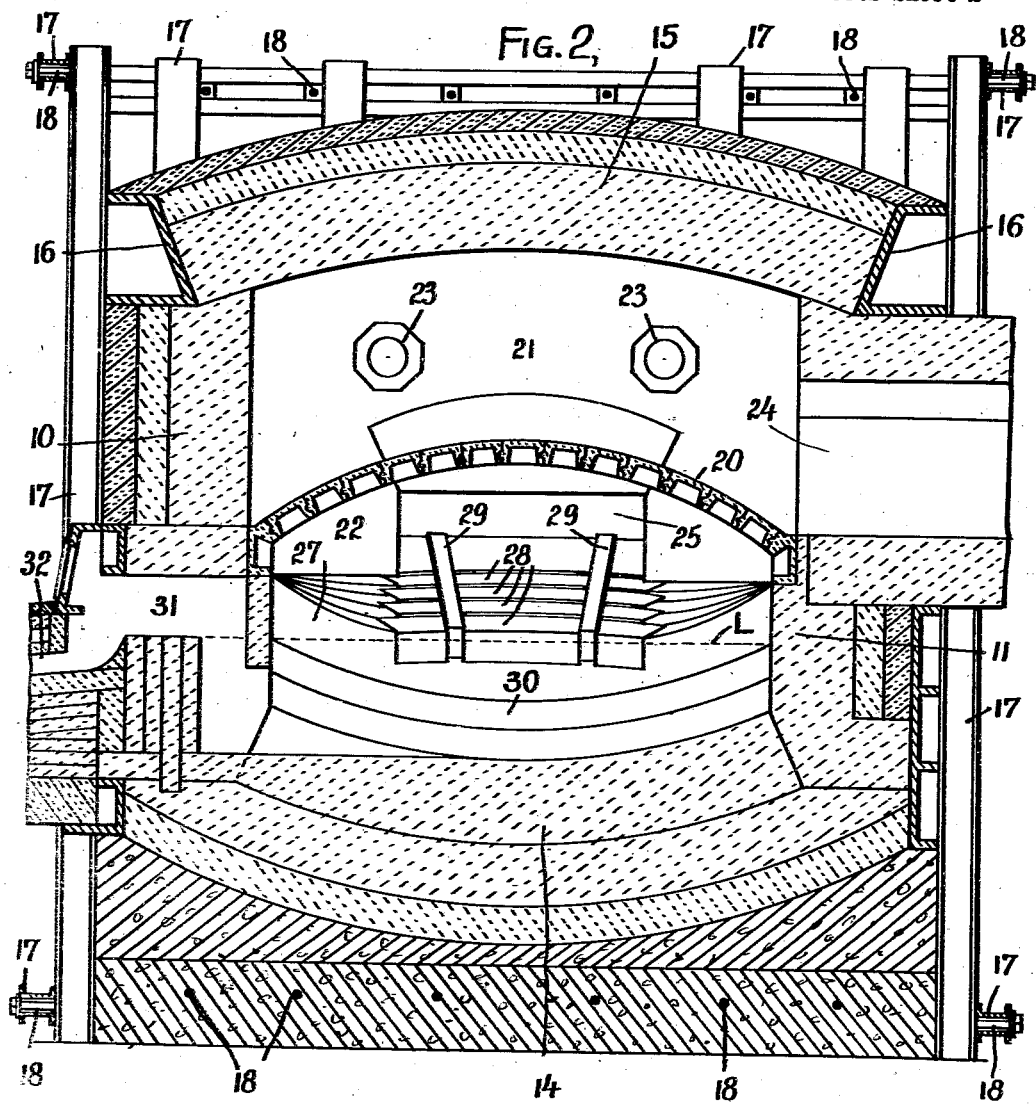
Fig. 2 is a vertical cross section through the furnace shown in Fig. 1.
Figure 3:
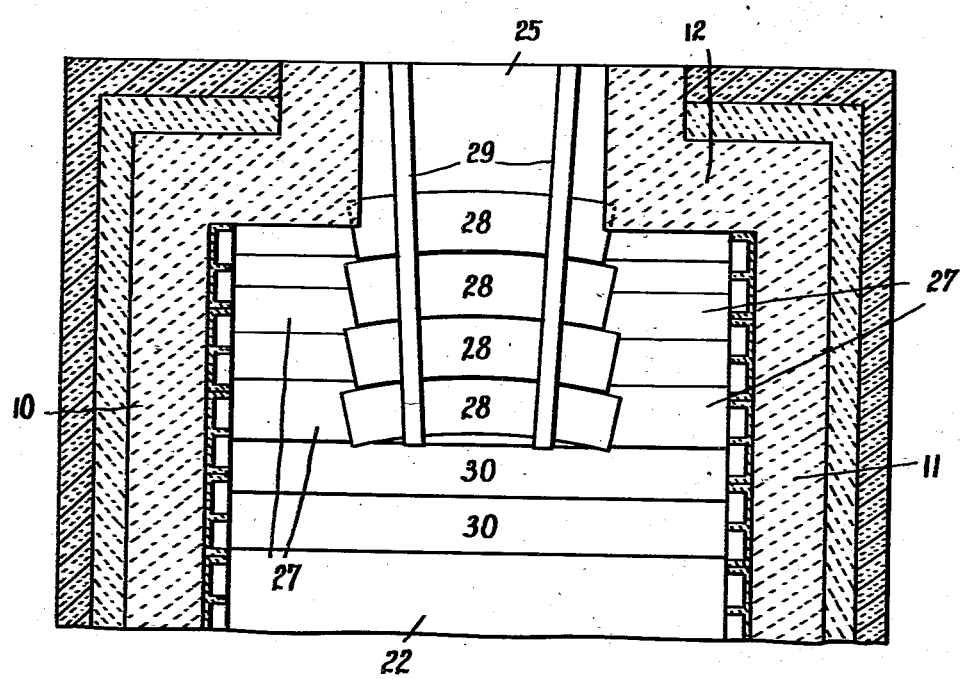
Fig. 3 is a plan of the ledge at one end of the furnace, taken substantially along the line 3—3 of Fig. 1.

In order to insure further against damage to the surface courses 28 by metal being pushed thereover, each course is offset downwardly with respect to the course next nearer to the charging opening, as is shown particularly in Figs. 1 and 2. As a result of this downward offset of each successive course 28, there is a minimum of danger that a brick in any course will project up sufficiently to be caught by solid metal being pushed downwardly along the ledge and to be thereby dislodged from position in the ledge.

To protect the ledge still further from mechanical injury by solid metal being pushed thereover, two or more refractory rails 29 (composed, for example, of silicon carbide) may be set in the surface layer of the ledge. The rails advantageously are arranged so that their top surfaces project slightly above the upper surfaces of the masonry in the surface courses 28. The rails 29 support metal introduced through the charging openings 25 above the surface courses 28, and so still further reduce the danger of dislodging bricks by pushing solid metal downwardly along the ledge.

In order to reinforce the ledges 26 at the end within the furnace melting chamber, two or more buttressing courses 30 of refractory masonry may be provided. These buttressing courses are set into the floor of the furnace and are arched inversely in the same manner as the floor in order to resist the tendency of the individual bricks to break loose and float to the surface of the pool of molten metal.

In using the furnace, fuel introduced through the burners 23 is burned in the combustion chamber. The hot combustion gases pass in contact with the top surface of the arch 20 and heat it to a high temperature. The heat is conducted through the thin arch 20 to its under-surface, whence it is radiated to the metal in the melting chamber. Solid metal, for example, copper cathodes C, are introduced through the charging openings 25 and are pushed along the adjacent ledges 26 toward the pool of molten metal normally maintained to a level L in the melting chamber. The copper cathodes or other solid metal may be held on the ledges directly beneath the arch 20 and may be exposed to heat radiated therefrom for a sufficient period of time to be heated substantially to the melting point. When thus heated, the solid metal may then be pushed from the ledge into the pool of molten copper or other metal.

The molten metal is withdrawn from the furnace through a tap hole 31 and launder 32 to the casting equipment.

The above-described provision of ledges within the melting chamber immediately adjacent the charging openings provides a convenient and simple arrangement for heating solid metal substantially to the melting point by means of radiant heat before the metal is introduced into the molten metal pool. The particular construction described above provides a sturdy ledge structure capable of resisting mechanical injury by the continued pushing of rough cathodes along the ledge and into the pool of molten metal.

I claim:

1. A furnace having side and end walls enclosing a melting chamber and a combustion chamber separated by a thin, substantially gas-tight partition, means for introducing hot combustion gases into said combustion chamber in contact with said partition, whereby said partition may be heated sufficiently to radiate heat to a charge of metal in the melting chamber, at least one of said furnace walls having a charging opening therein for introducing solid metal into said melting chamber, and a ledge within the melting chamber adjacent the charging opening and extending to a point directly beneath said partition, whereby metal introduced through said opening may be held on said ledge and may be heated in the solid state by radiant heat from said partition before being passed into the charge of molten metal.

2. A furnace having side and end walls and having a combustion chamber in the upper interior thereof and a melting chamber in the lower interior thereof, a substantially horizontal partition separating said combustion chamber from said melting chamber, at least one wall of said furnace having a charging opening therein for charging solid metal into said melting chamber, and a ledge within the melting chamber adjacent said charging opening and extending inwardly therefrom to a point directly beneath said partition.

3. In a muffler-type melting furnace having a melting chamber in which a metal charge is melted at least in part by heat radiated from above, and having a charging opening in a wall of said melting chamber, the improvement comprising a ledge arranged within the melting chamber substantially above the floor thereof and extending inwardly from immediately adjacent the charging opening to a point directly in the path of heat radiated from above into the melting chamber.

4. In a muffle-type melting furnace having a combustion chamber in the upper interior thereof and a melting chamber in the lower interior thereof with a thin, substantially horizontal partition therebetween, in which a metal charge in the melting chamber is melted at least in part by heat radiated from said partition, and further having a charging opening in a wall of said melting chamber, the improvement comprising a ledge arranged within the melting chamber substantially above the floor thereof and extending inwardly from the charging opening to a point directly beneath said partition.

5. In a muffler-type melting furnace having a combustion chamber in the upper interior thereof and a melting chamber in the lower interior thereof with a thin, substantially horizontal partition therebetween, in which a metal charge in the melting chamber is melted at least in part by heat radiated from said partition, and further having a charging opening in a wall of said melting chamber, the improvement comprising a ledge arranged within the melting chamber substantially above the floor thereof and extending inwardly from the charging opening to a point directly beneath said partition, said ledge sloping downwardly from the charging opening to facilitate the passage thereover of solid metal introduced through the charging opening.

6. In a furnace having side and end walls enclosing a melting chamber and having a charging opening in one of said walls, a ledge extending into said melting chamber from adjacent said charging opening, said ledge being constructed of refractory masonry with at least the central portion of the upper layer of said masonry being arched toward said charging opening.

7. In a furnace having side and end walls enclosing a melting chamber and having a charging opening in one of said walls, a ledge extending into said melting chamber from adjacent said charging opening, said ledge comprising a supporting structure of inversely arched refractory masonry and a surface structure of refractory masonry arched toward said charging opening.

8. In a furnace having side and end walls enclosing a melting chamber and having a charging opening in one of said walls, a ledge extending into said melting chamber with a downward slope from said charging opening, said ledge comprising a surface layer of masonry arched toward said charging opening, each course of masonry in said surface layer being offset downwardly with respect to the course next nearer to the charging opening.

9. In a furnace having side and end walls enclosing a melting chamber and having a charging opening in one of said walls, a ledge extending into said melting chamber from adjacent said charging opening, said ledge being constructed of refractory masonry and having a plurality of refractory rails set in the surface portion thereof with the upper surface of said rails projecting slightly above the surface masonry of the ledge.

10. In a furnace having side and end walls enclosing a melting chamber and having a charging opening in one of said walls, a ledge extending into said melting chamber from adjacent said charging opening, said ledge comprising a supporting structure of inversely arched refractory masonry, and a buttressing course of masonry disposed immediately before said ledge and reinforcing the end thereof within the melting chamber.

11. In a furnace having side and end walls enclosing a melting chamber and having a charging opening in one of said walls, a ledge extending into said melting chamber with a downward slope from said charging opening, said ledge comprising a supporting structure of inversely arched refractory masonry and a surface layer of refractory masonry arched toward the charging opening, each course of masonry in said surface layer being offset downwardly with respect to the course next nearer to the charging opening, a plurality of refractory rails set in the surface layer of said ledge with the upper surfaces thereof projecting slightly above the surface layer of masonry, and a buttressing course of masonry disposed immediately before said ledge and reinforcing the end thereof within the melting chamber.

VERNON E. MacDONELL.